United States Patent [19]

Kreft et al.

[11] 4,328,546

[45] May 4, 1982

[54] APPARATUS FOR EVALUATING THE PERFORMANCE OF AN INTERNAL COMBUSTION ENGINE USING EXHAUST GAS EMISSION DATA

[75] Inventors: Keith A. Kreft, Mt. Prospect; Alan E. Rossetti, Glenview; Michael F. Lynn, Berwyn; Jesse W. Wagoner, Dundee, all of Ill.

[73] Assignee: Sun Electric Corporation, Crystal Lake, Ill.

[21] Appl. No.: 140,586

[22] Filed: Apr. 15, 1980

[51] Int. Cl.³ .................. G01L 25/00; F02D 17/00
[52] U.S. Cl. .................. 364/424; 324/378; 73/23; 73/116; 123/198 F
[58] Field of Search .......... 364/424, 442, 551; 324/378, 384; 73/116, 117.2, 23, 117.3, 118, 17; 123/198 F, 417, 440, 489

[56] References Cited

U.S. PATENT DOCUMENTS

| | | | |
|---|---|---|---|
| 3,788,129 | 1/1974 | Trussell | 324/378 |
| 3,940,977 | 3/1976 | Voross et al. | 324/378 |
| 3,998,095 | 12/1976 | Tinkham et al. | 73/117 |
| 4,125,894 | 11/1978 | Cashet et al. | 364/424 |
| 4,143,635 | 3/1979 | Iizuka et al. | 123/198 F |

*Primary Examiner*—Mark E. Nusbaum
*Assistant Examiner*—Gary Chin
*Attorney, Agent, or Firm*—Allegretti, Newitt, Witcoff & McAndrews

[57] ABSTRACT

An improved automated engine diagnosing device employing a digital data processor and a cathode ray tube monitor for displaying individual engine cylinder numbers in separate association with correlated values of exhaust gas emissions pollutants. Engine timing data associated with the time of firing of individual cylinders of the engine being tested synchronizes select cylinder firing inhibition for orderly accumulating gas emissions data generated from an exhaust probe placed in the tail pipe of the automobile under test. An automatic sequential firing inhibition and a manually selectable firing inhibition permits dual modes of data acquisition for developing pollutant data to be utilized by the processor for generating the analysis display on the cathode ray tube monitor.

23 Claims, 16 Drawing Figures

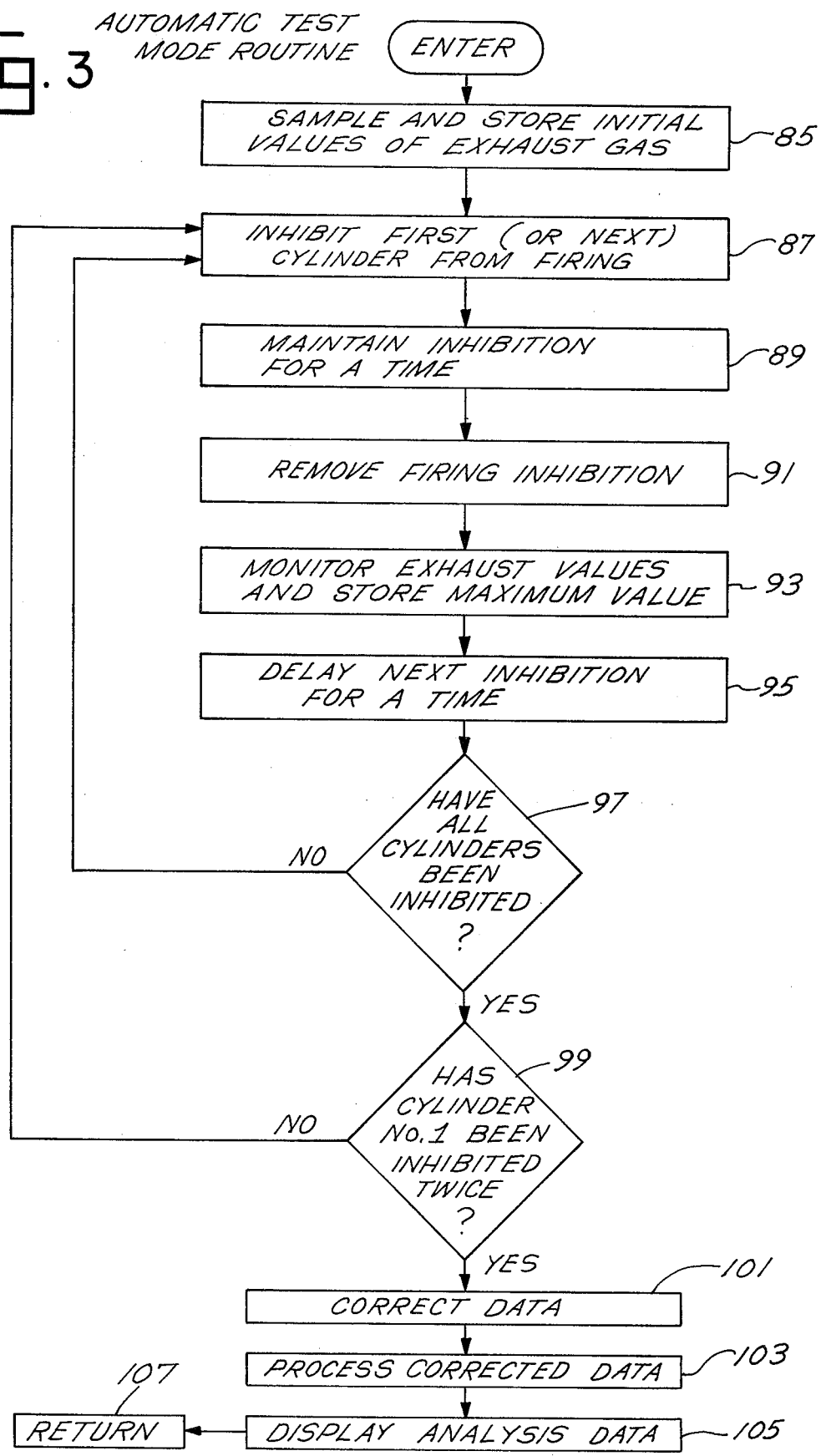

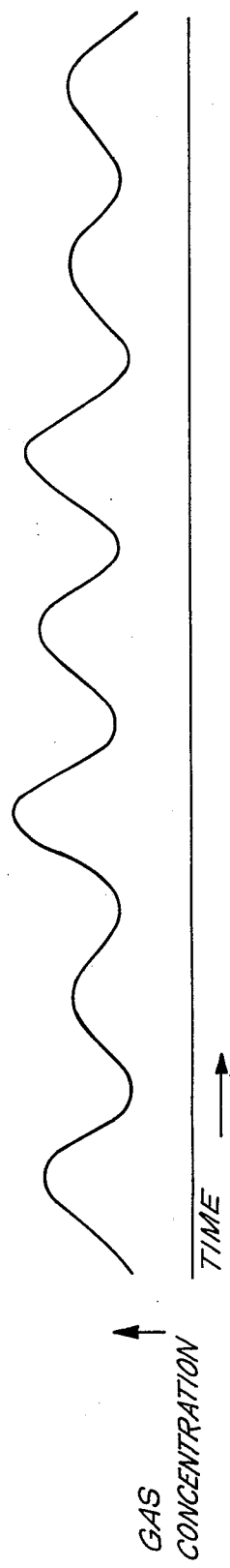
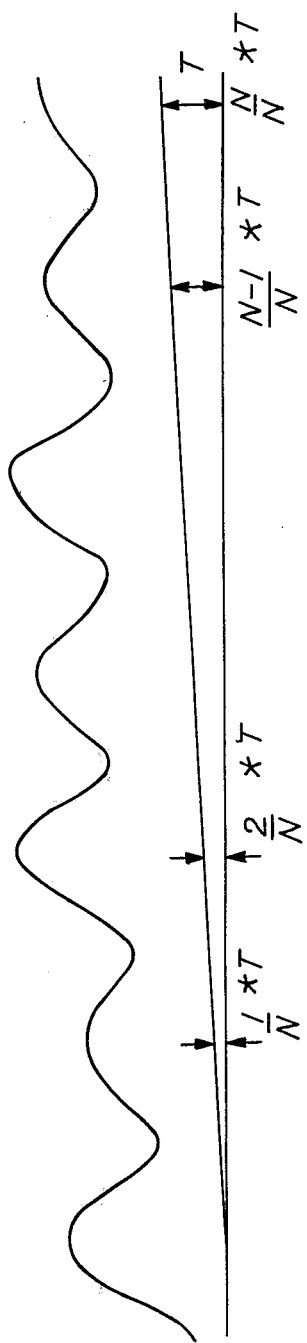

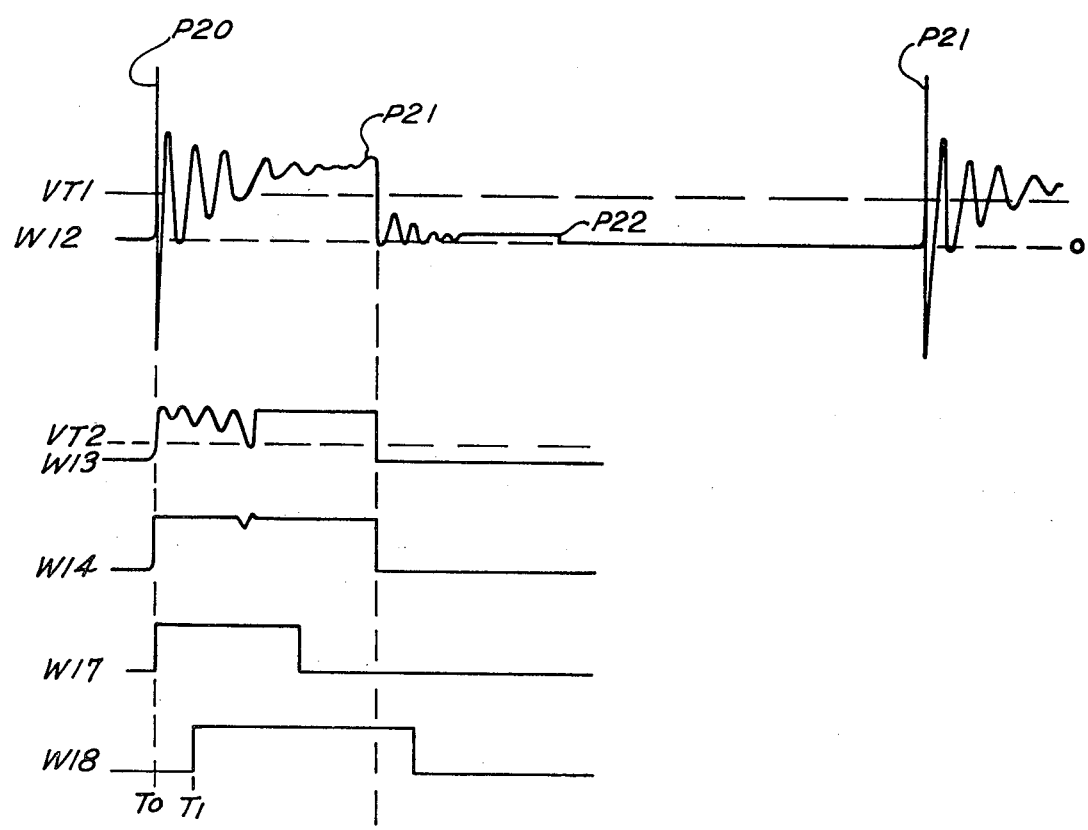

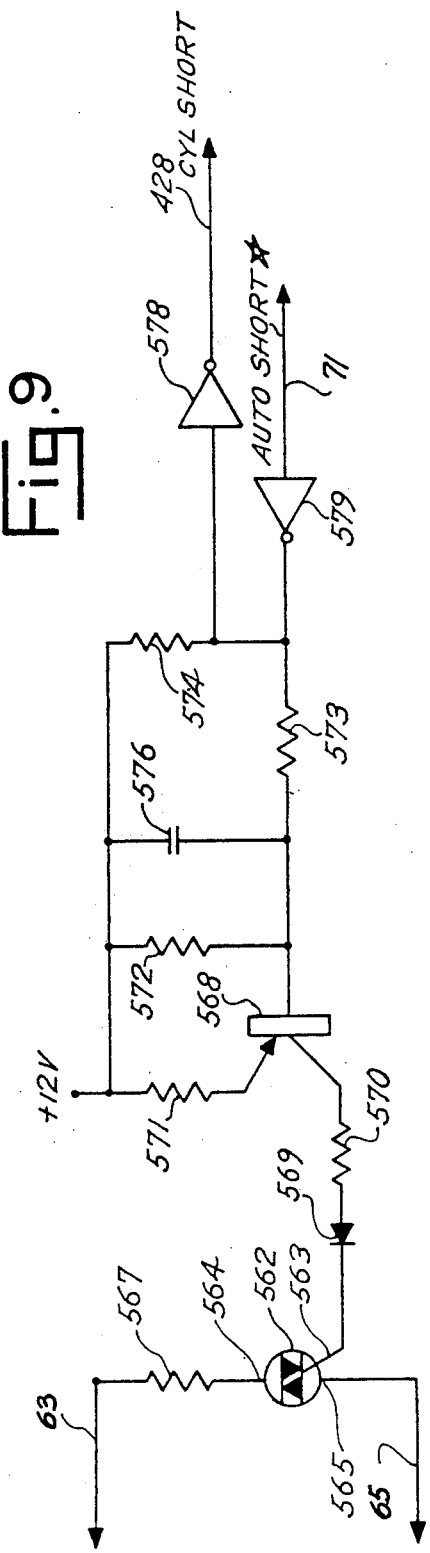

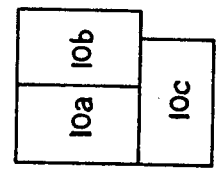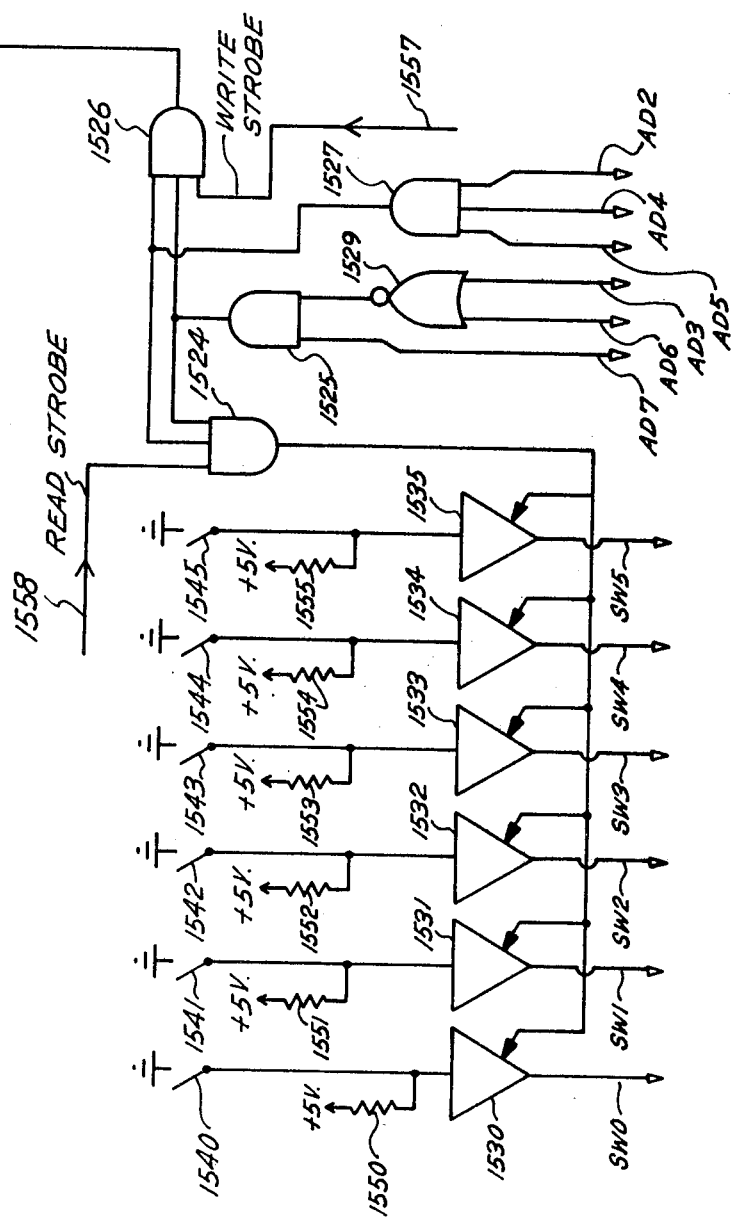

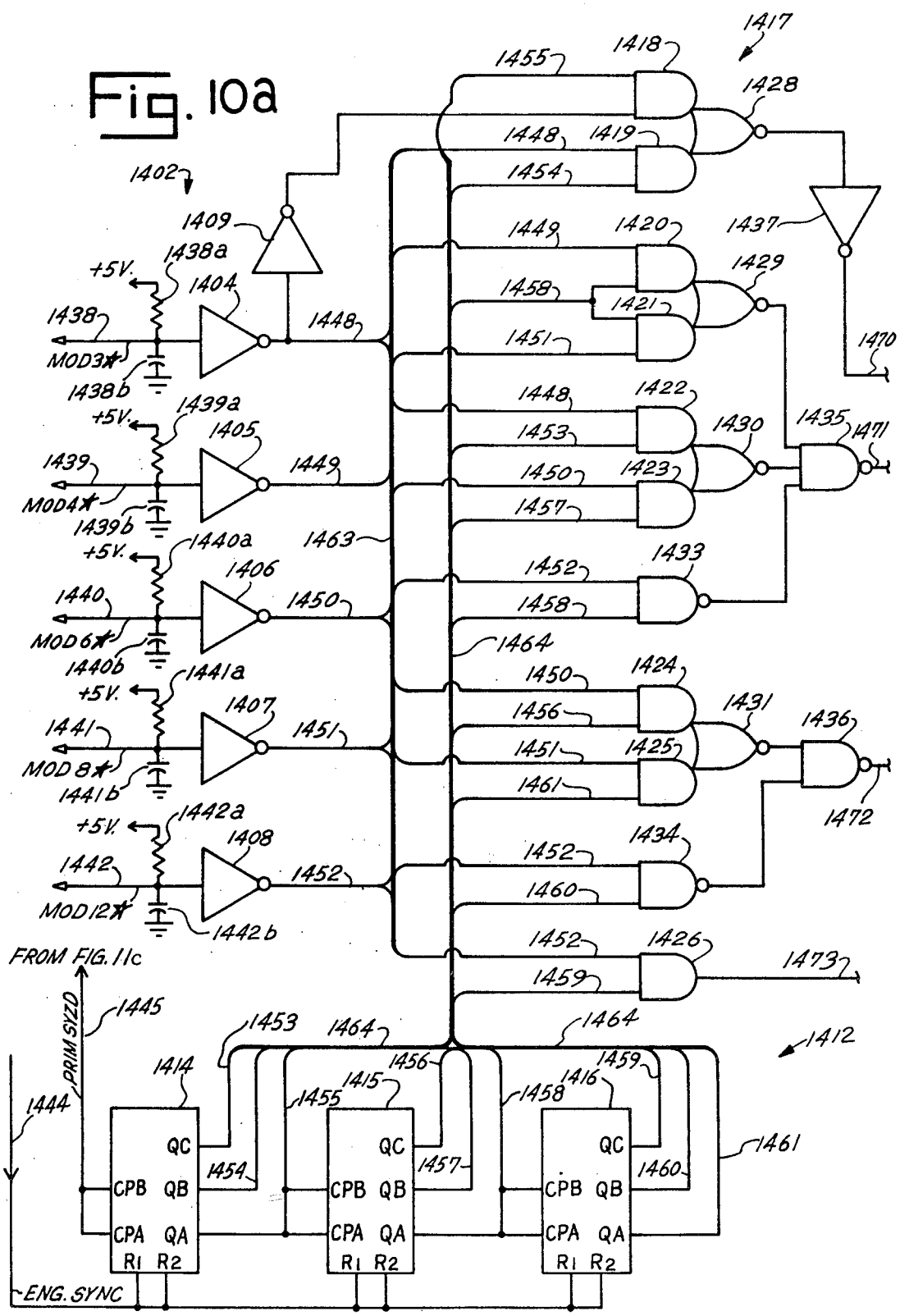

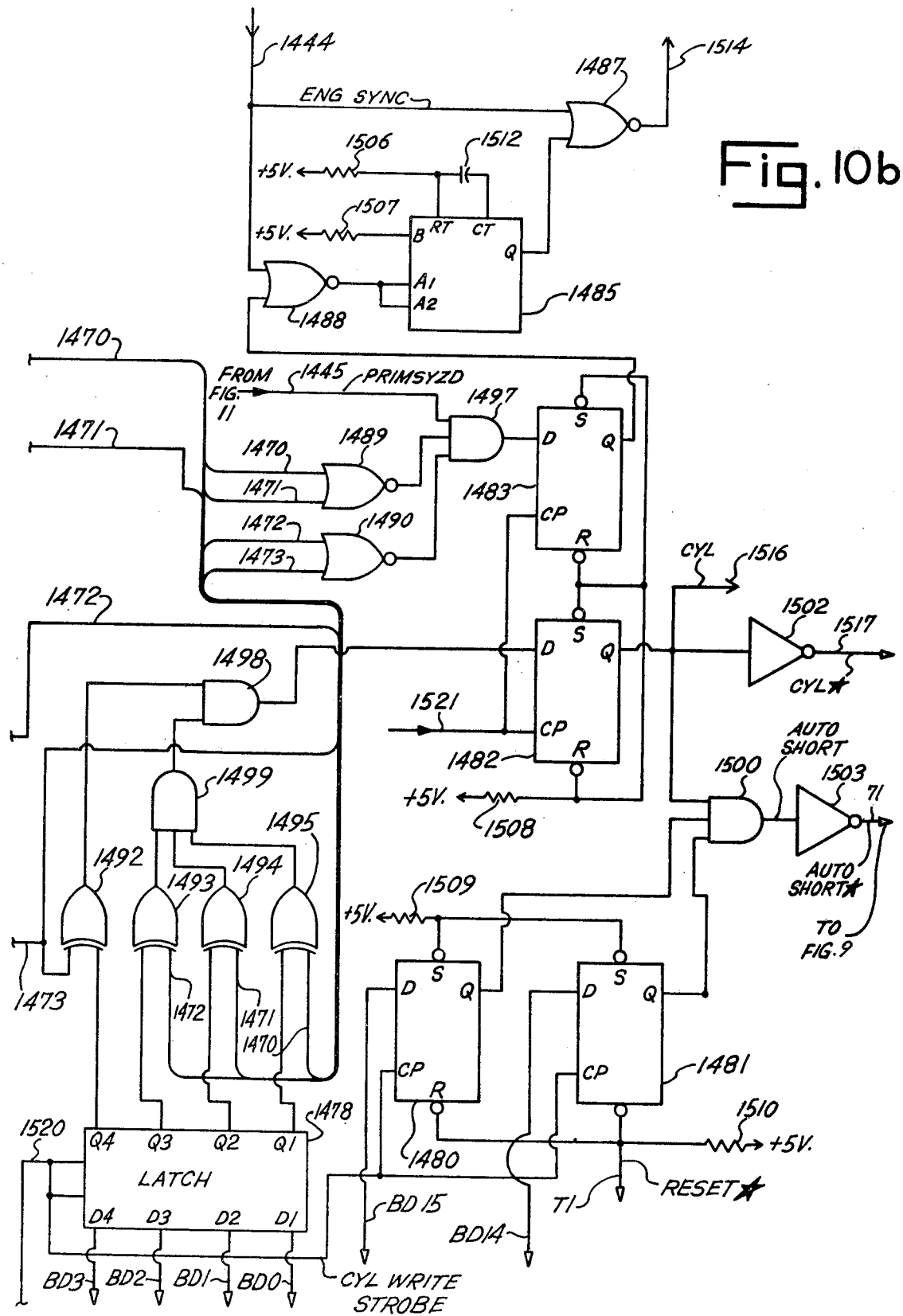

APPARATUS FOR EVALUATING THE PERFORMANCE OF AN INTERNAL COMBUSTION ENGINE USING EXHAUST GAS EMISSION DATA

BACKGROUND OF THE INVENTION

The present invention relates to an internal combustion engine analyzer, and more particularly to an analyzer for evaluating engine performance by monitoring exhaust gas emissions from the engine being analyzed.

The servicing of vehicle engines is becoming increasingly important because of road safety considerations and the public awareness of automotive emissions on the environment. In addition, the engines of current vehicles are becoming more difficult and complicated to diagnose and analyze.

Therefore it is highly desireable to provide the automotive mechanic with as much information as possible pertaining to the performance of the internal combustion engine being tested, for aiding the mechanic in diagnosing and repairing engine problem conditions.

More specifically, it is highly desireable to provide the mechanic with a device which will provide more information pertaining to individual cylinder combustion efficiency. The emissions gases (combustion by-products) contained in the engine exhaust provide an indication of combustion efficiency, however due to the slow response time of a gas measuring system at the automotive tailpipe, a change in emissions level caused by the firing of an individual cylinder will not be seen until several seconds after the cylinder has fired.

Nonetheless, it is an object of the present invention to provide an improved internal combustion engine analyzer for evaluating engine performance using exhaust gas emissions data collected on a per cylinder basis.

It is another object of the present invention to display to the automotive mechanic emissions data accumulated from a vehicle engine in an easy-to-understand form for facilitating automotive repairs.

It is yet another object of the present invention to provide an improved device for visually displaying to the operator mechanic an indication of the concentration of a particular engine emission gas occurring in accordance with the efficiency of firing of a select cylinder of the engine.

It is also another object of the present invention to provide an engine analyzer in which the operator may selectively inhibit a select cylinder from firing for generating information as to the concentration level of a particular emissions pollutant in association with indicia identifying the select cylinder inhibited.

It is another object of the present invention to provide an engine analyzer which displays a combustion by-product value for a particular cylinder in visual association with the displayed number of the cylinder to which the by-product is related.

It is another object of the present invention to extend the conventional operating range of hydrocarbon gas measurement above 2000 ppm when performing a cylinder firing inhibition test.

It is yet another object of the present invention to provide an engine analyzer which generates a display of the absolute change of a by-product emission caused by a select cylinder firing inhibition.

SUMMARY OF THE INVENTION

These and other objects of the present invention are achieved by monitoring the operation of an engine to be tested for responsively generating timing signals representing the time of firing of each of the cylinders of the engine. The exhaust gas output from the engine is simultaneously monitored for generating data signals representative of the quantity of a combustion by-product in the exhaust gas output. The apparatus inhibits a select cylinder from firing and data signals representative of the quantity of the by-product caused by the select cylinder inhibition are generated. By-product information is visually displayed to the operator mechanic in a specific format.

BRIEF DESCRIPTION OF THE DRAWINGS

FIG. 3 is a flow diagram of a test routine of a processor unit of the preferred embodiment of FIG. 2.

FIGS. 4A and 4B are graphical representations of an ideal gas curve and a gas curve having possible error due to gas build-up respectively.

FIG. 8a illustrates exemplary voltage waveforms generated by the circuitry illustrated in FIG. 8.

FIG. 9 is a schematic diagram of a shorting control circuit.

FIG. 10 illustrates the manner in which FIGS. 10a–10c should be arranged.

FIGS. 10a–10c are schematic diagrams of a cylinder selection circuit.

DESCRIPTION OF THE PREFERRED EMBODIMENT

Figure 1:
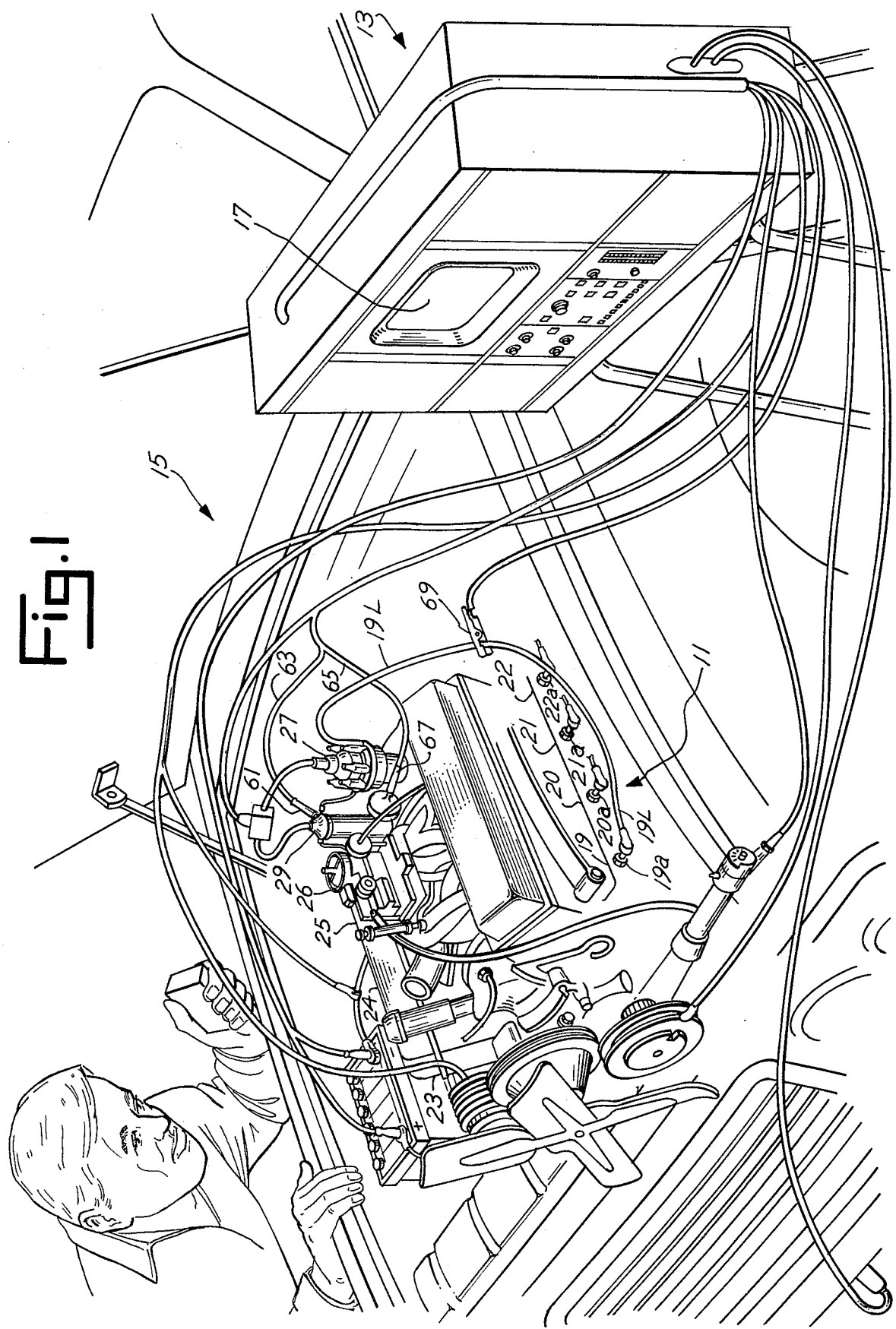
FIG. 1 is a perspective view of an internal combustion engine which is connected to a prior art engine analyzer in which a preferred embodiment of the present invention may be utilized.

Referring to FIG. 1, an exemplary V-8 internal combustion engine 11 is capable of being diagnosed by a prior art Sun Electric Model 2001 Engine Analyzer 13. Analyzer 13 is described in detail in U.S. Pat. No. 4,125,894 issued to Cashel et al on Nov. 14, 1978. The Cashel Patent is incorporated herein by reference to indicate the analyzer environment in which the preferred embodiment of the present invention may be utilized.

A plurality of engine monitoring leads 15 are connected to engine 11 at a plurality of locations for retrieving electrical signals and exhaust gas samples indicative of test data to be received by analyzer 13 for processing. Analyzer 13 includes a cathode ray tube (CRT) 17 for visually displaying various engine operating parameters and analysis information to the mechanic operator as the operator conducts different operating test sequences on the engine 11, as described in the Cashel Patent.

Engine 11 comprises cylinders or ignition chambers 19–26 which are fitted with sparkplugs or igniters 19a–26a (19a–22a are shown). Sparkplugs 19A–26A are connected to a distributor 27 by sparkplug leads 19 L–26 L (19 L being shown). Distributor 27 includes a rotor (not shown) which distributes high voltage ignition signals to each of the sparkplugs in a defined sequence. The rotor receives high voltage ignition signals from a coil assembly 29 comprising a primary coil (not shown) which is magnetically coupled to a secondary coil (not shown). Voltage signals are generated in the primary coil by an 8-sided cam (not shown) which is mechanically rotated in synchronism with engine 11 in order to periodically open and close contact points (not shown). The primary coil voltage induces in the secondary coil high voltage ignition or firing signals or pulses which fire the sparkplugs sequentially.

Although engine 11 has been described with a conventional mechanical contact point ignition system, it should be understood that the present invention may be used to diagnose engines having more sophisticated ignition systems in which electronic or semiconductor switches are used in place of mechanical contacts.

A preferred embodiment of the present invention may be incorporated into analyzer 13 for diagnosing an engine of the above-described type. The preferred embodiment is illustrated in block form in FIG. 2.

Figure 2:
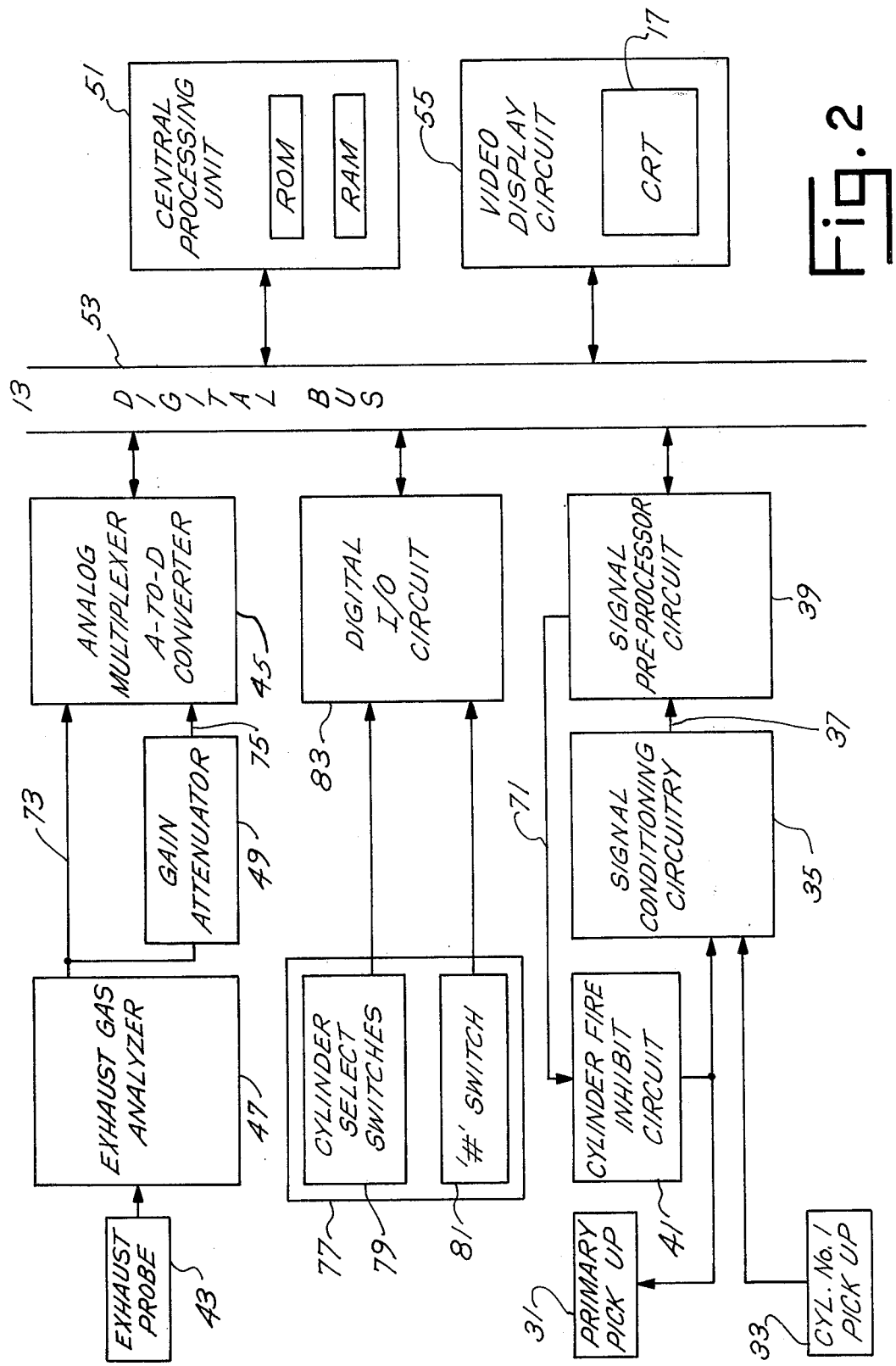
FIG. 2 is a block diagram of a hardware configuration of the preferred embodiment.

Referring to FIG. 2, the operating condition of the engine is monitored by a primary pickup 31, a CYL No. 1 pickup 33 and a signal conditioning circuitry 35 for generating a plurality of timing signals along a conductor bus 37. The timing signals are fed to a signal preprocessor circuit 39 which controls a cylinder fire inhibit circuit 41, for selectively inhibiting one or more selected cylinders of the engine from firing. Cylinder firing inhibition is controlled by preprocessor circuit 39 in accordance with the timing signals generated along conductor bus 37.

In association with cylinder firing inhibition, the exhaust gas from engine 11 is monitored by an exhaust probe 43 for generating data along a conductor bus 53, representative of the quantity of one or more combustion by-products in the exhaust gas. An exhaust gas analyzer 47, a gain attenuator 49 and an analog multiplexer/A-to-D converter 45 serve to transform the response of probe 43 to data signals for transmission to a central processing unit (CPU) 51 via a digital bus 53.

CPU 51 controls the operation of signal preprocessor circuit 39 for inhibiting select cylinders from firing in order to retrieve pertinent data signals from analog multiplexer/A-to-D converter 45. The CPU processes the retrieved data signals for generating display signals for transmission to a video display circuit 55 for generating a visual display on CRT 17 of exhaust emissions analysis data.

CPU 51 controls the overall system processing and management of the various operations of the preferred embodiment of the present invention. As will suggest itself, CPU 51 may be utilized to control other engine test procedures as described in the Cashel Patent, and similiarly, the other components illustrated in FIG. 2 may be utilized for other functions as will suggest themselves.

With reference to FIG. 2 in more detail, primary pickup 31 is a block diagram representation of a primary clip 61 (FIG. 1) which samples the engine primary signal via a lead 63, in conjunction with a lead 65 which is connected to chassis ground via a clip 67. The CYL No. 1 pickup 33 is a block diagram representation of a clamp-on trigger pick-up 69 (FIG. 1) which is normally clipped around a sparkplug lead for the number 1 cylinder (e.g., lead 19L).

Primary pickup 31 (FIG. 2) and CYL No. 1 pickup 33 provide signals to signal conditioning circuitry 35 for generating a pulse at the time the No. 1 cylinder of the engine is fired and for generating a pulse at the time of firing of each of the cylinders of the engine.

Reference is made to the Cashel Patent for a detailed description of signal conditioning circuitry, particularly the description with respect to FIGS. 3, 5, 5a, 13 and 14h of the Cashel Patent.

Figure 6:
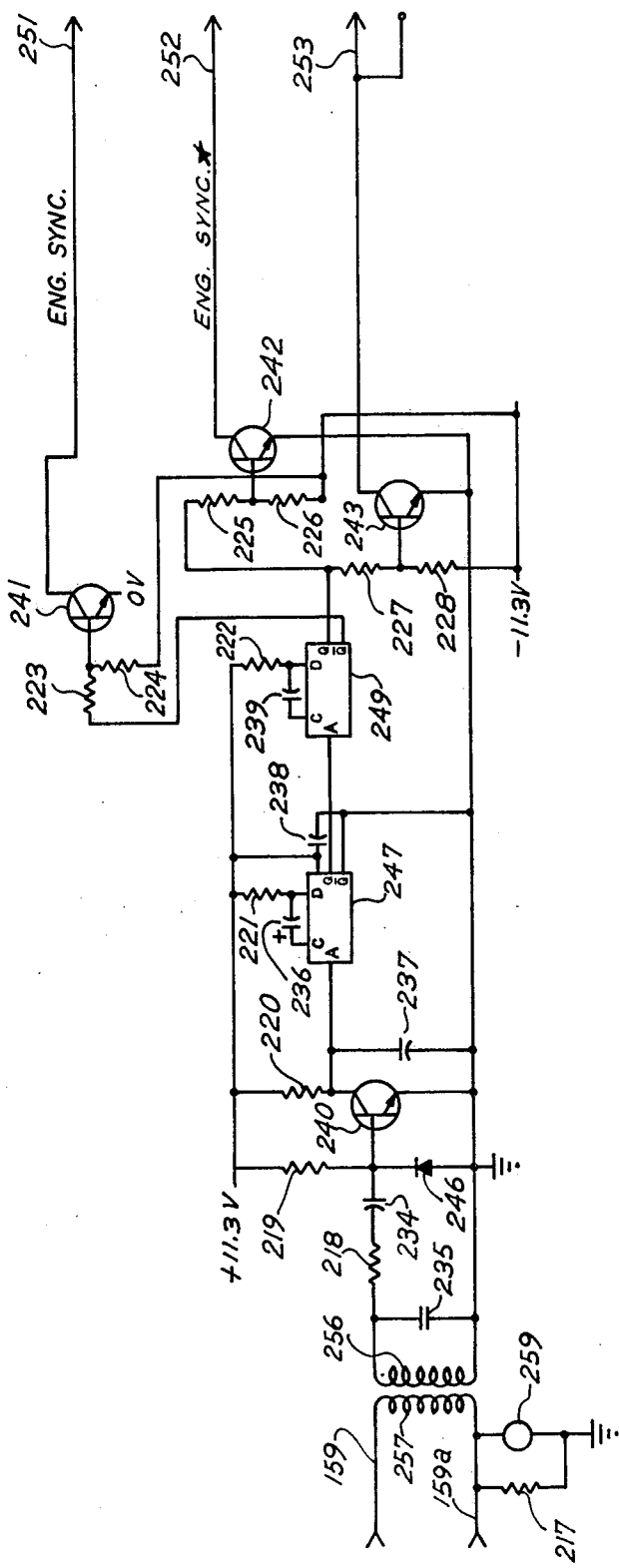
FIG. 6 is a schematic diagram of a trigger generator circuit.

FIG. 3 of the Cashel patent is illustrated as FIG. 6 herein. Referring to FIG. 6, a trigger generator 215 is used to generate an ENG SYNC* pulse at the time the no. 1 cylinder of the engine is fired. (Throughout the specification, an asterisk (*) is used to identify the inverse or complement of a pulse or signal identified without an asterisk.)

Referring to FIG. 6, the trigger generator comprises resistors 217–228, capacitors 234–239, transistors 240–243 and a diode 246, connected as shown. A 9 millisecond one-shot multivibrator 247 and a 1.3 millisecond one-shot multivibrator 249 are used to suppress noise which may be picked up on the input to the trigger generator. Output conductor 251 provides an ENG SYNC pulse when spark plug 19a is fired, and output conductors 252–253 each provide an ENG SYNC* pulse which is the complement of the ENG SYNC pulse. Transformer coils 256, 257 provide an input signal from CYL. #1 pick-up 33 (FIG. 2) via conductors 159, 159a, and an over-voltage protection is provided by a varactor 259.

Figure 7:
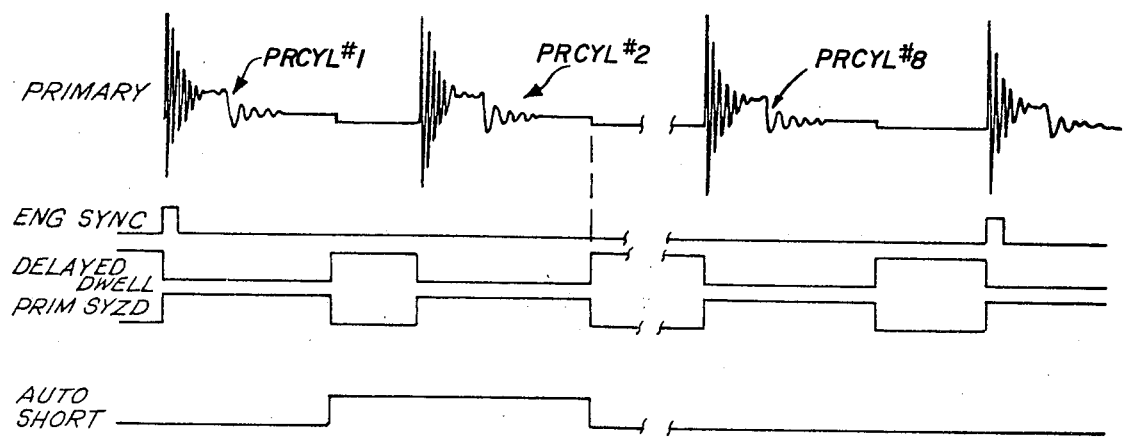
FIG. 7 illustrates exemplary voltage waveforms produced by the circuits shown in FIGS. 10, 10a–10c and 11.

Further, Cashel's FIG. 14h is shown as FIG. 7 of the present application. FIG. 7 illustrates exemplary primary ignition waveforms PRCYL #1, PRCYL #2 and PRCYL #8 which correspond with the primary ignition signals produced in order to fire spark plugs of the #1 cylinder, the #2 cylinder and the #8 cylinder, respectively. Additional ignition waveforms, of course, are produced by primary coil 29 in order to fire spark plugs 19A through 26A. Also shown in FIG. 7 are the ENG SYNC pulses produced by the circuitry shown in FIG. 6.

Figure 5:
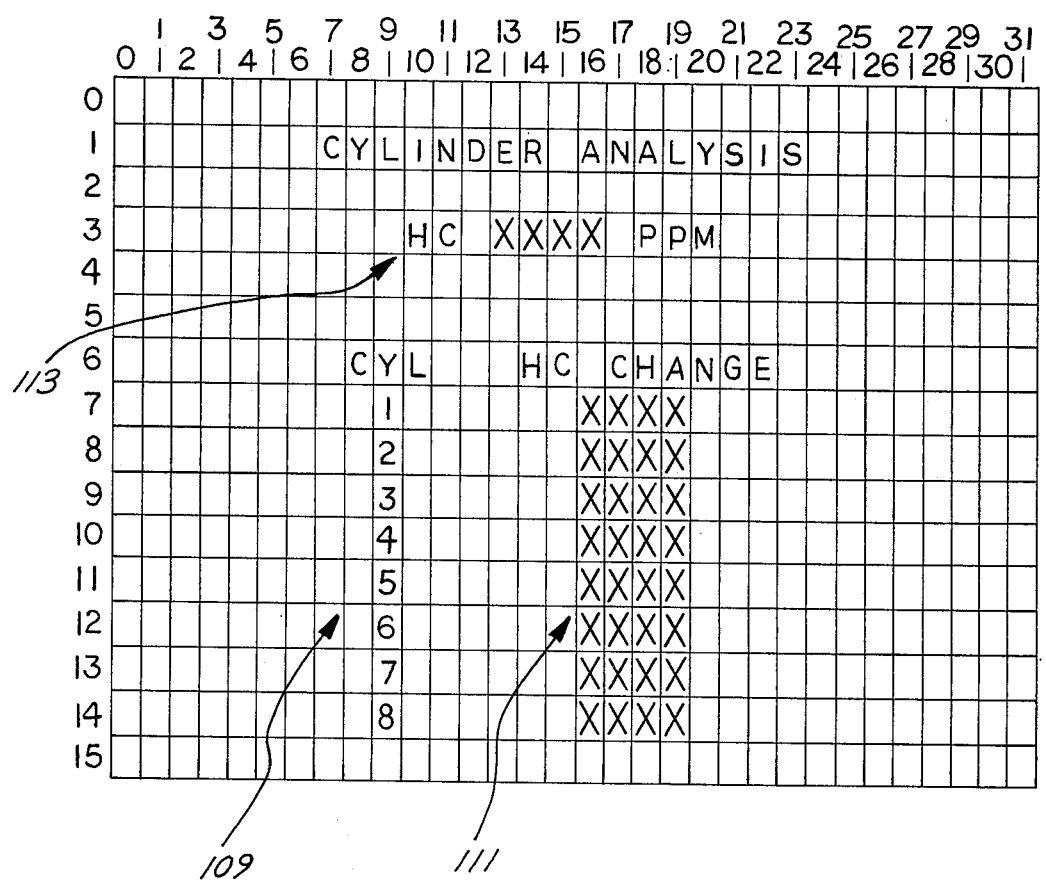
FIG. 5 illustrates a format displayed on a CRT screen of the preferred embodiment of FIG. 2.
Figure 8:
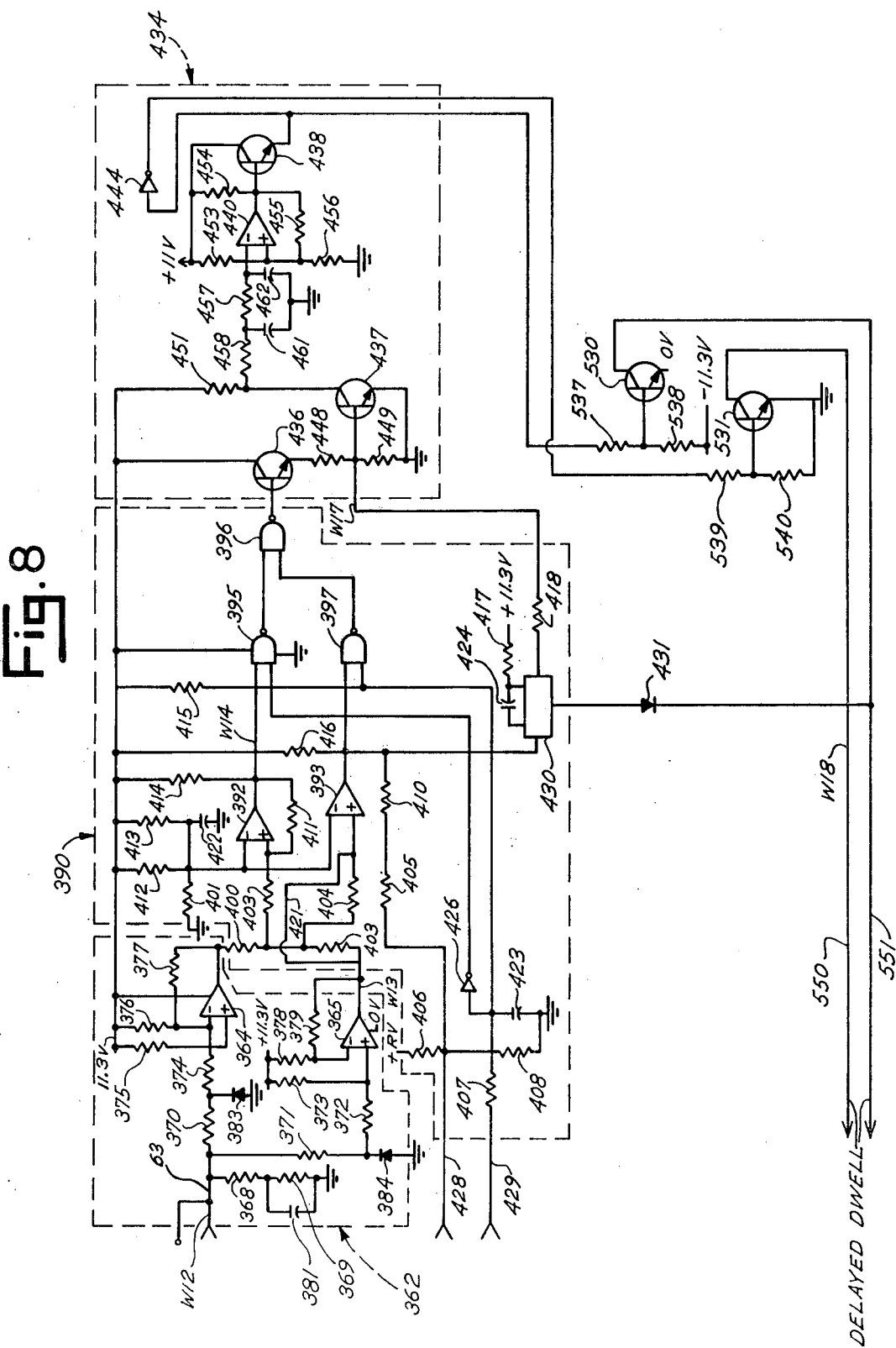
FIG. 8 is a schematic diagram of a signal generating circuitry.

FIGS. 5, 5a of the Cashel patent are shown as FIGS. 8 and 8a herein. The circuitry of FIG. 8 generates a DELAYED DWELL* pulse having a duration proportional to the time that the contact points of the engine are closed. Referring to FIG. 8, the circuitry includes an input circuit 362 capable of conditioning signals from a positive or negative grounded battery system. Circuitry 362 comprises operational amplifiers 364, 365 each connected as a comparator circuit, as well as resistors 368–379, and capacitor 381 and diodes 383, 384, connected as shown. A conditioning circuit 390 processes signals from conventional as well as high energy ignition circuits by means of operational amplifiers 392, 393, respectively, each of which is connected as a comparator circuit. The conditioning circuit also includes NAND gates 395–397, resistors 400–418, capacitors 421–424, an inverter 426, input conductors 428, 429 and a one-shot multivibrator 430 connected to a diode 431.

A stretching and delay circuit 434 includes transistors 436–438, an operational amplifier 440 connected as a comparator circuit, an inverter 444, resistors 448, 449, 451, 453-458, and capacitors 461-462, all connected as shown.

Driver transistors 530-531 amplify the signals conducted to output conductors 550-551. The transistors are biased by resistors 537-540.

The circuitry of FIG. 8 is basically used to condition the signals received from the automotive engine in order to provide a DELAYED DWELL pulse. The circuitry of FIG. 8 operates as follows:

Waveform W12 (FIG. 8a) illustrates an exemplary primary voltage waveform of the type received from primary pick-up 31. Waveform W12 includes a firing line P20 generated at the time the engine contact points open in order to fire a spark plug. The line between points P20 and P21 on waveform W12 indicates a time period during which current is gapping across the spark plug. At point P22, the contact points close in order to initiate the dwell portion of the ignition cycle. The dwell portion ends at point P21 when the contact points again open in order to fire another spark plug.

Operational amplifiers 364, 365 (FIG. 8) are arranged to accommodate either a negative battery or positive battery ignition system, respectively. The amplifiers from input primary signal W12 remove many of the oscillations by means of a comparator technique. For example, the inverting input of operational amplifier 365 may be biased approximately at voltage VT1 (see FIG. 8a). In response to this operation, the output of operational amplifier 365 produces voltage waveform W13.

Operational amplifiers 392 and 393 apply the same comparator technique as amplifiers 364 and 365 in order to convert waveform W13 into a signal more nearly resembling a pulse, such as voltage waveform W14. In order to achieve this result, the inverting input of operational amplifier 392 can be set at approximately VT2 volts (See FIG. 8a). In this mode of operation, operational amplifier 392 produces an output voltage waveform W14.

Operational amplifier 393 is used in connection with so-called high energy ignition (HEI) systems that produced higher voltages than conventional ignition systems. As a result, operational amplifier 393 is less sensitive than operational amplifier 392.

The output of amplifier 393 is connected to the input of one-shot 430 in order to produce an output voltage wave form W17. This voltage is used a noise blanking signal in order to produce a more nearly uniform pulse at the input of stretching and delay circuit 434.

Monostable multivibrator 430 produces a pulse having a duration of approximately one millisecond. It has been found that a multivibrator of this type is needed in connection with certain models of vehicle ignition systems which have a particularly long dwell time period.

NAND gates 394-397 select either the output of amplifier 392 or the output of amplifier 393 for conduction to circuit 434 depending on the state of conductor 429 which is operated from a switch on the front panel of analyzer 13. The switch may be set by the operator depending on whether a conventional system or a special high energy ignition system is being used in the vehicle being tested. (See FIG. 17a of the Cashel patent.)

The output of transistor 436 is amplified by a transistor 437 and is delayed by a filter and delay circuit comprising resistors 457, 458 and capacitors 461, 462. The delay circuit delays the leading and trailing edges of voltage waveform W14 by approximately 600 microseconds in order to produce a voltage waveform W18. This voltage is amplified by operational amplifier 440 and transistor 438. After being conditioned by inverter 444 and additional driver transistors 530, 531, the waveform and its inverse are transmitted over output conductors 550 and 551 as DELAYED DWELL and DELAYED DWELL* pulses, respectively. FIG. 7 shows the DELAYED DWELL signal. As will suggest itself, other circuitry configurations may be utilized for signal condition circuitry 35 which will generate timing signals along conductor bus 37 indicative of the time of cylinder number 1 firing and the time of each of the other cylinder firings.

Cylinder fire inhibit circuit 41 is operable according to a digital input pulse fed along a conductor 71 for loading the engines points contacts near ground for preventing the primary and secondary coils from firing any sparkplugs. Reference is now made to the Cashel Patent for circuitry description of a cylinder fire inhibit circuit, particularly, the description with respect to FIG. 6 of the Cashel Patent.

FIG. 6 of Cashel patent is illustrated as FIG. 9 herein. Referring to FIG. 9, a shorting control circuit comprises a triac 562 having a gate 563 and current conducting terminals 564, 565. The triac is connected in series with a resistor 567. Gate 563 is driven by a transistor 568, as well as a diode 569, resistors 570-574 and a capacitor 576. Inverters 578, 579 provide the various signals with proper polarity. Triac 562 is switched to its conductive state whenever the signal on conductor 71 is switched to its logical one state (i.e., whenever a positive AUTO SHORT* pulse is received). Whenever triac 562 is switched to its conductive state, the ignition contacts are shorted to ground (except for the low resistance of resistor 567 and triac 562), and the primary and secondary coils are prevented from firing spark plugs.

Signal preprocessor circuit 39 receives timing signals over conductor bus 37 for determining the time for output of a pulse onto conductor 71 for inhibiting a select cylinder from firing. Signal preprocessor circuit 39 is controlled by CPU 51 for selecting the particular cylinders to be inhibited by the preprocessor circuit.

As will suggest itself, signal preprocessor circuit 39 may take on different forms, as for example the circuitry described in the Cashel patent, for commanding cylinder inhibition of selected cylinders.

FIGS. 13, 13a-13c of the Cashel patent are illustrated herein as FIGS. 10, 10a-10c, respectively. Referring to FIGS. 10a-10c, a counting and cylinder control system comprises a cylinder selection circuit 1402, a counter circuit 1412, and a decoder circuit 1417, together with additional components.

Referring to FIG. 10a, cylinder selection circuit 1402 comprises input inverters 1404-1409. The inverters receive inputs from conductors 1438-1442 that are connected to resistors 1438a-1442a and capacitors 1438b-1442b, respectively. Input conductors 1438-1442 receive MOD³*, MOD⁴*, MOD⁶*, MOD⁸*, MOD¹²* signals from the front panel of analyzer 13 depending on whether the engine being tested has 3, 4, 6, 8 or 12 cylinders respectively.

Counter circuit 1412 includes flip-flop type counters 1414-1416 which continuously count through states 0-7 without being reset, except when the circuit is initially connected to an operating engine. After the first pulse transmitted over conductor 1444 (ENG SYNC) is received, the counter circuit is not reset, but continually counts through states 0–7 at a rate determined by the pulses received on conductor 1445 (PRIM SYZD).

Figure 11:
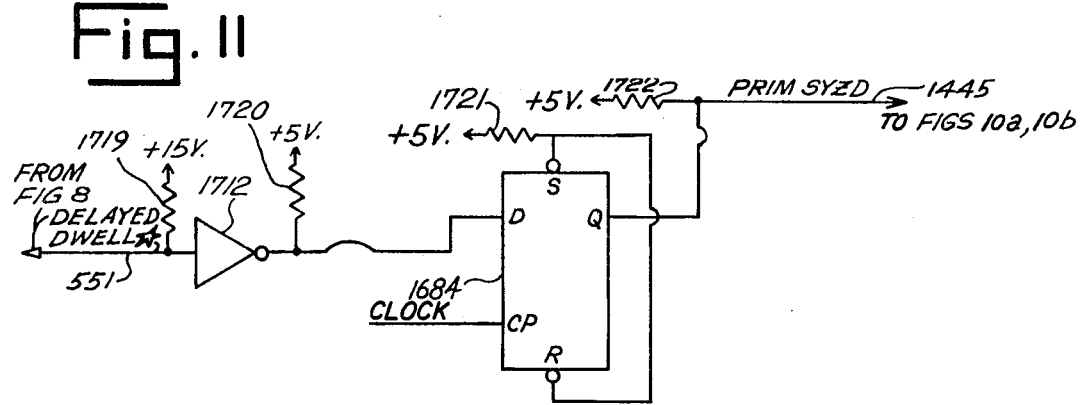
FIG. 11 illustrates a schematic diagram of a signal generating circuitry.

PRIM SYZD is shown in FIGS. 7 and 11. FIG. 11 is a portion of FIG. 14c of the Cashel patent. The circuitry of FIG. 11 includes a D-type flip-flop 1684, inverter 1712 and resistors 1719–1722.

The DELAYED DWELL* signal is inverted by inverter 1712 and is synchronized by clock signals in flip-flop 1684 in order to produce the PRIM SYZD signals shown in FIG. 7. The PRIM SYZD signals are transmitted to conductor 1445 (FIG. 10a) in order to advance counters 1414–1416. When the system is first turned on, the first ENG SYNC pulse resets counters 1414–1416, and thereafter, the counters continue to operate in response to the PRIM SYZD pulse without being reset.

Decoder circuit 1417 (FIG. 10a) comprises AND gates 1418–1426, NOR gates 1428–1431, NAND gates 1433–1436 and an inverter 1437. The cylinder selection circuit 1402, counter circuit 1412 and decoder circuit 1417 are interconnected by conductors 1448–1461 through cables 1463, 1464. Output conductors 1470–1473 represent digital bit positions 0–3, respectively for purposes for determining the spark plug of the engine which is about to be fired.

Referring to FIG. 10b, a latch 1478 receives binary information from data bus conductors BD0–BD3 (of digital bus 53). The circuitry of FIG. 10b further includes D-type flip-flops 1480–1483, a one shot multivibrator 1485, NOR gates 1487–1490, Exclusive OR gates 1492–1495, AND gates 1497–1500, inverters 1502–1503, resistors 1506–1510, a capacitor 1512, and output conductors 1514, 1516, 1517, 1520 and 1521.

Exclusive OR gates 1492–1495 operate as comparators. When the binary number stored in latch 1478 is identical to the binary number represented on output conductors 1470–1473, the Exclusive OR gates cause AND gate 1498 to produce an output pulse. During the next clock pulse received over conductor 1521, the Q output of flip-flop 1482 is switched to its one state and remains in its one state until the binary number represented by conductors 1470–1473 is changed.

Referring to FIG. 10c, AND gates 1524–1527 and a NOR gate 1529 are used to operate the remaining circuitry when an appropriate address in the form of binary data is received on address conductors AD2–AD7 (of digital bus 53).

The system also includes logic gates 1530–1535, switches 1540–1545, and resistors 1550–1555. The circuitry can be used in order to manually introduce data into the data processor by means of manipulating the switches. Output conductors 1557–1558 connect the circuitry in the manner shown.

In order to designate a particular cylinder of the engine for shorting, CPU 51 issues a CYLINDER SELECT OUTPUT COMMAND shown in the following Table 7:

TABLE 7

| AD2 | AD3 | AD4 | AD5 | AD6 | AD7 | BD15 | BD0–BD3 |
|---|---|---|---|---|---|---|---|
| 1 | 0 | 1 | 1 | 0 | 1 | Short=1 | No. of Cylinder |

If conductor BD15 is switched to its one state, the Q output of flip-flop 1480 (FIG. 10b) is switched to its one state so that inverter 1503 is enabled to produce AUTO SHORT* pulse. If conductor BD15 is switched to its zero state, AND gate 1500 is disabled so that no AUTO SHORT* pulse can be produced. During a WRITE STROBE (initiated by CPU 51), the number of the selected cylinder is stored in latch 1478 from conductors BD0–BD3. The remaining portion of FIG. 10a–10c is described in the Cashel patent and relates to functions not concerned with the present invention.

More particularly, signal preprocessor circuit 39 may comprise a slave microprocessor, as for example, a Motorola 6802 Microprocessor chip. CPU 51 addresses preprocessor circuit 39 and transmits an inhibit control data word to the preprocessor circuit via digital bus 53. The control data word carries information as to the particular cylinder number or numbers to be inhibited by the preprocessor circuit. The slave microprocessor monitors the timing information on conductor bus 37 for providing a pulse output along conductor 71 at the appropriate times in each engine firing cycle for inhibiting the selected cylinder as identified by the control data word from CPU 51.

Also, an uninhibit control data word may be transmitted to signal preprocessor circuit 39 which instructs the preprocessor circuit to discontinue cylinder inhibition, permitting the engine to run normally.

Once an inhibit control data word is fed to signal preprocessor circuit 39, the preprocessor circuit repeatedly places a pulse along conductor 71 at the time the selected cylinder is to fire in order to repetitively inhibit the selected cylinder until instructed otherwise by CPU 51.

Signal preprocessor circuit 39 is a subassembly component manufactured by Sun Electric Corporation as Board #7001-120 which is used in various engine testers manufactured by Sun Electric Corporation.

Exhaust gas analyzer 47 is connected to an exhaust probe 43 which is placed in the tail pipe assembly of the vehicle being tested. Analyzer 47 may be implemented by a variety of available devices which are capable of producing output voltages on a conductor bus 73 having amplitudes proportional to the amounts of a pollutant or other non-pollutant gas emitted from engine 11, as seen by probe 43. The preferred embodiment will be described with reference to measuring hydrocarbons (HC), however other products of combustion also may be measured, as for example, carbon monoxide (CO), nitric oxide (NO), nitrogen dioxide ($NO_2$), carbon dioxide ($CO_2$) and oxygen ($O_2$). An analyzer which may be utilized as exhaust gas analyzer 47 is the analyzer used in Sun Electric Model 2001 Analyzer (See the Cashel Patent). Such an analyzer measures n-hexane based hydrocarbons, which is preferred.

A gain attenuator 49 is utilized to attenuate the analog signal developed from hydrocarbon measurements by analyzer 47. The analog signal for hydrocarbons passes along conductor bus 73 into analog multiplexer/A-to-D converter 45 and also passes via gain attenuator 49 to the converter 45. The use of gain attenuator 49 permits a high range of relative measurements of hydrocarbons, as great as ten thousand parts per million, as described hereinafter.

Analog multiplexer/A-to-D converter 45 controls the analog signals developed along conductor bus 73 and the analog signals developed from gain attenuator 49 along a conductor 75, for systematically channeling the signals to a single analog-to-digital converter for changing the form of the signals to digital measurement signals. More particularly, either of the signals appearing on conductor bus 73 or conductor 75 is separately addressable by CPU 51 for channeling through the A-to-D converter for output onto digital bus 53.

Data acquisition by CPU 51 may be performed in either of two modes, an automatic mode or a manual mode. In the automatic mode, data sampling and cylinder ignition inhibition are automatically controlled by the CPU in firing order sequence. In the manual mode, the operator selects and controls which cylinder, or cylinders, is to be inhibited at any given time.

The operator communicates with CPU 51 via an operator control panel 77 which may comprise a keyboard and a control switch assembly similar to that disclosed in the Cashel patent. As in the Cashel patent, it is necessary that control switch panel 77 include set up switches which must be properly adjusted by the operator before the system is ready for operation, including a switch which informs CPU 51 as to the number of cylinders in the engine to be tested (see FIG. 17A and the associated description in the Cashel patent).

In order to describe the preferred embodiment of the present invention, control switch panel 77 is illustrated showing only cylinder select switches 79 and a # switch 81. As is understood, other control switches and the like may be included in control panel 77 in accordance with the particular type of analyzer within which the present invention is being utilized.

Cylinder select switches 79 include 12 separately actuable switches, each of which being associated with a particular cylinder number, and a release switch for resetting the 12 switches. The cylinder select switches 79 are selectively actuable by the operator for selecting a particular cylinder to be inhibited. The # switch includes a single electrical switch which is actuable for indicating that the operator is instructing an automatic mode of operation.

A digital I/O circuit 83 transforms the position of switches 79, 81 into a digital output signal for placement onto digital bus 53 in order to communicate operator instructions to CPU 51. CPU 51 will monitor the digital I/O circuit 83 until a start of the test is detected. The automatic test is started when the operator presses # switch 81. The manual test is started when any cylinder or combination of cylinders is selected via the cylinder select switches 79.

After the test is initiated, CPU 51 will control the sequencing of all events via digital bus 53. During testing, exhaust gas analyzer 47 samples the engine exhaust gas via exhaust probe 43 and generates voltages which are representative of combustion by-product levels. These voltages are fed into the analog multiplexer/A-to-D converter 45 and the hydrocarbon voltages are also fed into gain attenuator 49. CPU 51 will command analog multiplexer/A-to-D converter 45 to select and sample an appropriate voltage for output to CPU 51. CPU 51 then processes all information gathered and displays the results on the CRT 17.

Signal preprocessor circuit 39 continuously monitors engine conditions while CPU 51 is controlling the sequencing of the test. When CPU 51 decides it is time to inhibit a cylinder from firing, it accordingly commands signal preprocessor circuit 39 to inhibit a select cylinder via cylinder fire inhibit circuit 41.

In preparation for an automatic mode test, the engine is brought up to a desired speed by the operator, and emissions data are allowed to settle to steady-state levels. The operator then signals that the test is to begin via # switch 81, and CPU 51 begins its control sequence in accordance with the flow diagram illustrated in FIG. 3.

Refering to FIG. 3, CPU 51 performs a number of steps 85-107 for conducting the automatic test mode of operation. Initial values of exhaust gas concentrations are sampled and saved at step 85 prior to cylinder inhibition. The first cylinder is inhibited from firing at step 87. The inhibition is maintained at step 89 long enough for the engine RPM to settle to a new level. The CPU controls the time of inhibition by a discrete time delay which may be fixed at a value dependent on the RPM of the engine during the test, i.e. the RPM of the engine running without cylinder inhibition. The maximum time of cylinder inhibition is preferred to be 8 seconds.

Thereafter, the engine firing inhibition is removed allowing the engine to run normally once again (step 91). The gas measuring system will then begin to see the effects of the cylinder inhibition. The changing emissions levels are monitored at step 93 and the maximum emissions levels are stored.

The CPU delays the next cylinder inhibition at step 95 until either: (1) the rate of change of exhaust by-product value has subsided enough to indicate that the effects of the previous cylinder inhibition have died out, or (2) a sufficient amount of time has elapsed to insure that the effects of the previous cylinder inhibition are negligible. This will insure that sampling periods are synchronized with cylinder inhibition periods for all lengths of vehicle exhaust systems. In the preferred embodiment, the exhaust by-product value is monitored for at least 4 seconds (minimum delay) until the value falls to $\frac{1}{2}$ its peak value or until 12 seconds (maximum delay) has lapsed, whichever is shorter, for providing the delay at step 95.

Because of varying lengths in exhaust systems of different vehicles to be tested, the response time of the gas analysis system varies. Also the gas measuring device will not see a change in emissions levels until several seconds after it actually occurs. This places timing constraints on the sequencing of cylinder ignition inhibition in the sampling of data.

If steps 87 through 95 have not been performed once for each cylinder, then such steps are repeated via step 97. After step 97 indicates that each cylinder has been inhibited once, cylinder No. 1 is inhibited a second time via step 99. Thus, the CPU will collect the following data: (a) an initial sampling of the emissions level with the engine running normally; (b) a sampling of emissions levels with the engine running with each cylinder individually inhibited, beginning with cylinder No. 1; and (c) a second sampling of emissions levels with the engine running with cylinder No. 1 inhibited.

Once such data has been collected, the data samples are corrected for gas build-up at step 101 using a linear correction algorithm, as described hereinafter. Corrected samples are then processed at step 103 (described hereinafter) and thereafter the processed data is displayed as analysis data via step 105.

In the manual mode operation, the operator controls the sequencing of the data acquisition cycle. As in the automatic mode, the engine must be allowed to reach a steady state condition at a desired RPM prior to the test beginning. The operator initiates the test by selecting one or more cylinders to be inhibited via the cylinder select switches 79. Immediately prior to cylinder inhibition, CPU 51 reads the emissions levels and stores the same as a base reading.

The emissions level changes for the inhibited cylinder will not be computed and displayed by the CPU until the operator changes the cylinders to be inhibited, either by selecting different cylinders via cylinder select switches 79 or by selecting no cylinders by the actuation of the cylinder release button on panel 77. Once the operator changes the cylinders to be inhibited, the current emissions levels will be compared to the base levels stored previously and the amount of change will be computed and displayed as described hereinafter.

In both modes of operation, the raw data received from analog multiplexer/A-to-D converter 45 must be processed before it is displayed to the operator on CRT 17. Two algorithms are applied to the data, one algorithm is for linear correction (automatic mode only) and the other algorithm is for processing the emissions change values to display values.

The exhaust gas measuring system generates a voltage which represents the concentration of a certain by-product in the gas. Several such voltages are generated to represent the concentration of several different by-products. The correlation between the output voltage of the exhaust gas measuring system and the actual gas concentration is not a simple function; CPU 51 utilizes a stored lookup table for determining the absolute value of a gas concentration for a given voltage output from analyzer 47.

However, conventional gas analyzer equipment for hydrocarbons is designed to indicate up to 2000 parts per million (ppm) of hydrocarbons in the gas being analyzed. The output of such conventional analyzers typically are set at a voltage at a full scale reading of 2000 ppm, which is near the full scale input of the A-to-D converter 45 to optimize display resolution.

The gas measuring system of the presently described embodiment is designed so that the hydrocarbon concentation range corresponding to a 0 to 5 volt output is adequate for all the normal 0–2000 ppm range emissions testing. However, when one or more cylinders are inhibited from firing, the hydrocarbon emissions levels may exceed the useful limit of the measuring system. If the measuring system puts out a voltage in the range of 5 to 12 volts, for example, the A-to-D converter 45 may be overranged, and may give an incorrect digital output. The cylinder performance test of the preferred embodiment is based upon comparitive changes in emissions levels and not absolute values, therefore, it is not necessary to compute absolute values. Only a magnitude indication of hydrocarbon change is displayed making it unnecessary to interpret absolute hydrocarbon levels for voltages in the 5–12 voltage range, as described hereinafter.

Depending on the particular product of combustion being measured, the analog voltage from the exhaust gas measuring system may have to be attenuated, as is the case with measuring hydrocarbons. This serves to extend the operating range of gas analyzer 47, permitting the analog-to-digital converter 45 to process signals that would normally be too large for it to handle.

At the beginning of each test, the first reading taken uses the attenuated voltage from gain attenuator 49 and also uses the normal gas measuring voltage appearing on conductor bus 73. These two voltage readings may be utilized for relating the attenuated voltage directly to an emission level. If the base gas reading taken by normal means is beyond the usable range of the measuring system, then the base gas reading is arbitrarily set to the maximum usable reading the system can generate (2000 ppm). This is to insure that there will always be one known point to reference the attenuated voltage scale to the normal voltage scale.

For the purposes of this test, because the relationship between the hydrocarbon concentration input and the associated actual voltage output of analyzer 47 is relatively linear, a hydrocarbon concentration above 2000 ppm can be calculated. Thus because of the relation of the value of the base reading in ppm and the attenuated base voltage reading is available, a relative emission level "X" in ppm can be generated for any level of the attenuated voltage by using a mere ratio analysis, i.e.:

$$\frac{\text{base reading in ppm}}{\text{attenuated base voltage reading}} = \frac{X \text{ in ppm}}{\text{attenuated voltage reading}}$$

This calculation is performed for each cylinder which is inhibited. The available data used by CPU 51 to perform each calculation comprises one base reading in ppm taken at the beginning of the test, one attenuated voltage reading taken at the beginning of the test and one attenuated voltage reading taken for each cylinder inhibition.

The base reading (in ppm) is subtracted from each of the calculated per cylinder relative emissions levels (in ppm) to yield a relative change. Although this relative change is displayed in proper units (ppm) for the gas of interest being measured, the actual numeric values do not represent correct absolute measurement. The numbers are intended only to show relative differences between per cylinder emission levels.

As previously described a linear correction algorithm is utilized to eliminate any errors which may occur due to exhaust gas build-up in the gas measuring system. The response time of the system is extremely slow and to allow the gas system to completely purge itself after each cylinder inhibition period would make the test sequence unbearably and unnecessarily long.

FIG. 4A illustrates an emissions level versus time plot for an ideal gas measuring system. As a cylinder is inhibited, the emissions level begins to rise until a maximum "pollution" level is reached. After the cylinder is again allowed to fire, the readings will begin to fall again. Since the test described herein is only concerned with maximum values read, it is not necessary to allow the falling values to reach their absolute minimum. The next cylinder in the sequence may be inhibited before this minimum occurs, preferably at ½ the peak value as stated above. However, any gas that has not been completely flushed from the system may make the next reading look higher than it actually is.

FIG. 4B shows the final effect of such gas build-up. As time goes on, the exhaust by-product introduced for each cylinder period becomes greater. To determine the total amount of the error, cylinder No. 1 is inhibited and retested immediately after the last cylinder in the sequence is tested. This reading should be the same as the reading taken at the first time cylinder No. 1 was inhibited, since it is taken under the same conditions. If it is not, the difference is due to gas build-up in the system.

If it is assumed, that the gas build-up occurred at a constant rate throughout the test, then the amount of error in each cylinders data can be computed. Thus, if there is a 4-cylinder engine and the gas build-up is 100 units, the error for each cylinder reading will be as follows:

Cylinder No. 1: no error first time.
Cylinder No. 2: 1/4*100=25 units.
Cylinder No. 3: 2/4*100=50 units.
Cylinder No. 4: 3/4*100=75 units.

Cylinder No. 1: 4/4*100=100 units, (second reading of cylinder No. 1).

Subtracting these values from the per cylinder readings will eliminate the error due to gas build-up in the exhaust gas measuring system. As will be understood, this correction can only be performed in the automatic test sequence since in the manual mode the CPU has no control over the sequencing of the cylinder inhibition and data sampling time intervals. However, during the manual mode the operator can insure that no significant gas build-up occurs by adjusting the time intervals. Also, the CPU is unable to guarantee that two readings are taken for cylinder No. 1, at the start of the test and one at the end.

CPU 51 generates video display information to video display circuit 55 for generating visual information to the mechanic operator via CRT 17. The Cashel patent describes in detail the particular manner in which the CPU and the video display circuit cooperate. Particularly reference is made to FIG. 5 which illustrates a general format to be displayed on the CRT screen of the CRT 17. Individual cylinder numbers are displayed in a vertical column 109 in association with a parallel column 111 of numbers representing a hydrocarbon change which occurred when its respective associated cylinder number was inhibited from firing. FIG. 5 shows the HC change data as a plurality of X's. These X's represent the processed readings which are generated by CPU 51 during the cylinder analysis emission test. As will suggest itself, other columns of data for by-products other than hydrocarbons may be included in row-association with the cylinder numbers of column 109.

Also, the absolute value of hydrocarbons is displayed on the CRT screen at 113 in units of parts per million. CPU 51 monitors the voltage level along conductor bus 73 for hydrocarbons and converts the voltage level to a hydrocarbon absolute value for display at 113 on the CRT screen. However, once the hydrocarbon level exceeds 2000 ppm, an upward pointing arrow ( ↑ ) is displayed in the numeric position (shown with X's) for indicating that the hydrocarbon concentration is exceeding the level capable of being accurately interpreted by exhaust gas analyzer 47. The hydrocarbon ppm display 113 is continuously updated by CPU 51 so that the operator can monitor the hydrocarbon level as the level climbs to a peak and then descends after a particular cylinder has been inhibited, assuming of course that the hydrocarbon level does not exceed 2000 ppm.

It should be understood, of course, that the foregoing disclosure relates to a preferred embodiment of the present invention and that modifications may be made therein without departing from the spirit or scope of the invention as set forth in the appended claims.

What is claimed is:

1. An internal combustion engine analyzer comprising:

monitoring means connectable to an internal combustion engine for monitoring the operation of the engine for responsively generating timing signals representing the time of firing of each of the cylinders of the engine;

preprocessor means connected to said monitoring means for receiving said timing signals, said preprocessor means selectably operable for inhibiting a selected cylinder of the engine from firing;

exhaust gas measuring means for monitoring the exhaust gas output from the engine for generating a data signal representative of the quantity of a combustion by-product in the exhaust gas output;

visual display means responsive to display signals for generating a visual display; and processor means communicating with said exhaust gas measuring means, with said preprocessor means and with said visual display means for operating said preprocessor means to inhibit a selected cylinder from firing and for receiving said data signals to provide an indication of the quantity of said combustion by-product in said gas output during firing inhibition of said selected cylinder, said processor means generating first display signals for causing said display means to visually display an indication of said quantity of said combustion by-product, and second display signals for causing said display means to visually display an indication of the cylinder number selected, in visual association with said indication of said quantity of said combustion by-product.

2. An internal combustion engine analyzer according to claim 1 wherein said monitoring means includes a first test lead for monitoring the firing of individual cylinders and includes a second test lead for monitoring a predetermined cylinder firing of the cylinders of the engine.

3. An internal combustion engine analyzer according to claim 2 wherein said preprocessor means includes cylinder fire inhibit means electrically connected with respect to the engine primary for inhibiting of firing of a cylinder.

4. An internal combustion engine analyzer according to claim 1 wherein said preprocessor means is selectively addressable by said processor means for inhibiting a selected cylinder.

5. An internal combustion engine analyzer according to claim 4 wherein said preprocessor means is instructable with respect to which cylinders should be inhibited from firing and is instructable to discontinue firing inhibition.

6. An internal combustion engine analyzer according to claim 5 wherein said preprocessor means includes a microprocessor operatively controlled by said processing means.

7. An internal combustion engine analyzer according to claim 3 wherein said preprocessor means utilizes said timing signals for controlling the time of inhibition of said primary.

8. An internal combustion engine analyzer according to claim 1 wherein said exhaust gas measuring means includes an exhaust probe for placement in the tail pipe of the automobile housing the engine to be analyzed.

9. An internal combustion engine analyzer according to claim 1 wherein said exhaust gas measuring means measures a concentration of hydrocarbons in the exhaust gas output and generates an analog signal representative of said concentration within a first range of ppm values, said exhaust gas measuring means includes means for extending said first range to a second range of ppm values for measuring hydrocarbon levels caused by inhibition of firing of a selected cylinder.

10. An internal combustion engine analyzer according to claim 9 wherein said means for extending includes attenuator means for attenuating said analog signal to a voltage range of values; and wherein said exhaust gas measuring means includes an analog-todigital converter for converting the attenuated analog signal from said attenuator means to a digital signal.

11. An internal combustion engine analyzer according to claim 10 wherein said attenuator means has a fixed attenuation; and wherein said analog-to-digital converter means receives said analog signal for providing a base reading of said hydrocarbon concentration for association with said attenuated analog signal; and wherein said processor means receives a digital signal output from said converter means representative of said analog signal and receives a digital signal output from said converter means representative of said attenuated analog signal for formulating a value representative of a hydrocarbon concentration level.

12. An internal combustion engine analyzer according to claim 1 wherein said processor means includes a stored program for sequentially causing separate inhibition in time of each of the cylinders of the engine for generating a visual display representative of a quantity of a combustion by-product for each cylinder separately, caused by said separate inhibition of each of the cylinders of the engine; and further includes manual control means for causing initiation of said stored program.

13. An internal combustion engine analyzer according to claim 12 wherein said display means generates a column of first indicia of the numbers of cylinders of the engine to be analyzed and generates a parallel column of second indicia of quantities of a combustion by-product caused by separate firing inhibition of each of the cylinders, each of said quantities visually associated with a separate one of the cylinder numbers of said first indicia.

14. An internal combustion engine analyzer according to claim 1 and further including manual control means for providing operation instructions to said processor means, said manual control means selectively actuable for instructing firing inhibition of a selected cylinder.

15. An internal combustion engine analyzer according to claim 14 wherein said manual control means includes a plurality of individual switches, each of the cylinders of the engine being analyzed being associated with a separate one of said switches, each of said switches actuable for indicating an inhibited state of the firing of its associated cylinder.

16. An internal combustion engine analyzer comprising:
monitoring means connectable to an internal combustion engine for monitoring the operation of the engine for responsively generating timing signals representing the time of firing of each of the cylinders of the engine;
cylinder inhibit means connected to said monitoring means for receiving said timing signals, said cylinder inhibit means selectably operable for inhibiting a selected cylinder of the engine from firing;
exhaust gas measuring means for monitoring the exhaust gas output from the engine for generating a data signal representative of the quantity of a combustion by-product in the exhaust gas output;
visual display means for generating a visual display of a change in the combustion by-product caused by cylinder firing inhibition;
processor means communicating with said exhaust gas measuring means and with said visual display means for receiving said data signals and responsively controlling said visual display means for causing said display means to visually display indicia representative of the change in the combustion by-product due to selected cylinder inhibition, said processor means being instructable for operating said cylinder inhibit means to inhibit a selected cylinder from firing; and
manual control means connected to said processor means and being selectively actuable for instructing said processor means to cause firing inhibition of a selected cylinder.

17. An internal combustion engine analyzer according to claim 16 wherein said manual control means includes a plurality of individual switches, each of the cylinders of the engine being analyzed being associated with a separate one of said switches, each of said switches actuable for indicating an inhibited state of the firing of its associated cylinder.

18. An internal combustion engine analyzer according to claim 16 wherein said cylinder inhibit means includes cylinder fire inhibit means electrically connected with respect to the engine primary for inhibiting of firing of a selected cylinder.

19. An internal combustion engine analyzer according to claim 18 wherein said cylinder inhibit means utilizes said timing signals for controlling the time of inhibition of said primary.

20. An internal combustion engine analyzer according to claim 16 wherein said exhaust gas measuring means includes an exhaust probe for placement in the tail pipe of the automobile housing the engine to be analyzed.

21. An internal combustion engine analyzer comprising:
monitoring means connectable to an internal combustion engine for monitoring the operation of the engine for responsively generating timing signals representing the time of firing of each of the cylinders of the engine;
cylinder inhibit means connected to said monitoring means for receiving said timing signals, said cylinder inhibit means selectably operable for inhibiting a selected cylinder of the engine from firing;
exhaust gas measuring means for monitoring the concentration of hydrocarbons in the exhaust gas output from the engine for generating a data signal representative of said concentration within a first range of ppm values, said exhaust gas measuring means including means for extending said first range to a second range of ppm values for measuring hydrocarbon levels caused by inhibition of firing of a selected cylinder;
visual display means for generating a visual display of hydrocarbon concentration levels in said first and said second range;
processor means responsive to cylinder firing inhibition for communicating with said exhaust gas measuring means and with said visual display means for generating a display representative of hydrocarbon levels developed in said second range for indicating hydrocarbon levels generated during cylinder inhibition, said processor means being instructable for operating said cylinder inhibit means to inhibit a selected cylinder from firing; and
manual control means connected to said processor means and being selectively actuable for instructing said processor means to cause firing inhibition of a selected cylinder.

22. An internal combustion engine analyzer according to claim 21 wherein said means for extending includes attenuator means for attenuating said analog signal to a voltage range of values; and wherein said exhaust gas measuring means includes an analog-to-digital converter for converting the attenuated analog signal from said attenuator means to a digital signal.

23. An internal combustion engine analyzer according to claim 22 wherein said attenuator means has a fixed attenuation; and wherein said analog-to-digital converter means receives said analog signal for providing a base reading of said hydrocarbon concentration for association with said attenuated analog signal; and wherein said processor means receives a digital signal output from said converter means representative of said analog signal and receives a digital signal output from said converter means representative of said attenuated analog signal for formulating a value representative of a hydrocarbon concentration level.

* * * * *